(12) United States Patent
Dom et al.

(10) Patent No.: US 6,662,170 B1
(45) Date of Patent: Dec. 9, 2003

(54) SYSTEM AND METHOD FOR BOOSTING SUPPORT VECTOR MACHINES

(75) Inventors: Byron Edward Dom, Los Gatos, CA (US); Jianchang Mao, San Jose, CA (US); Dmitry Pavlov, Irvine, CA (US)

(73) Assignee: International Business Machines Corporation, Armonk, NY (US)

( * ) Notice: Subject to any disclaimer, the term of this patent is extended or adjusted under 35 U.S.C. 154(b) by 570 days.

(21) Appl. No.: 09/643,590

(22) Filed: Aug. 22, 2000

(51) Int. Cl.$^7$ ................................................ G06N 5/02
(52) U.S. Cl. ............................ 706/45; 706/20; 706/12
(58) Field of Search ............................ 706/45, 20, 12; 701/29; 382/227

(56) References Cited

PUBLICATIONS

Raetsch, Gunnar et al, SVM and Boosting: One Class, Sankt Augustin:GMD—Forschungszentrum Informationstechnik, 2000. —36 S.—(GMD report; 119), pp. 1–23.*
Boser, Bernhard E., A Training Algorithm for Optimal Margin Classifiers, 5th Ann. Workshop on Computational Learning Theory 1992, Pittsburgh ACM, Jul. 1992, pp. 144–152.*
Chen, Yunqiang, One–class SVM for learning in image retrieval, Image Processing, 2001. Proceedings 2001 International Conference on, vol.: 1, Oct. 7–10, 2001, pp. 34–37.*
G. Guo, H. Zhang, S. Z. Li, "Boosting for Content–Based Audio Classification and Retrieval: An Evaluation," Microsoft Research Technical Report: MSR–TR–2001–15.*
Pavlov, Dmitry, Scaling–Up Support Vector Machines Using Boosting Algorithm, International Conference on Pattern Recognition (ICPR'00)–vol. 2, Sep. 3–8, 2000, Barcelona, Spain, pp. 2219–2222.*
Publication: "Boosting the Margin: A New Explanation for the Effectiveness of Voting Methods". Schapire et al. The Annals of Statistics, 26(5): 1651–1686. pp. 1–30. 1998.
Publication: "A Brief Introduction to Boosting". Robert E. Schapire. Proceedings of the Sixteenth International Joint Conference on Artificial Intelligence. pp. 1–6. Jul. 31, 1999.
Publication: "Trends and Controversies. Support Vector Machines". Marti A. Hearst. IEEE Intelligent Systems. pp. 18–28. Jul./Aug. 1998.
Book: Chapter 12 "Fast Training of Support Vector Machines Using Sequential Minimal Optimization", John C. Platt. Generic Author Design Sample Pages. pp. 41–64. Aug., 1998.
Publication: "Arcing Classifiers". Breiman. The Annals of Statistics. 26(3):801–849. pp. 1–23. 1998.
Publication: "A Tutorial on Support Vector Machines for Pattern Recognition", Burges. Knowledge Discovery and Data Mining, 2(2), pp. 1–43. 1998.

* cited by examiner

*Primary Examiner*—Wilbert L. Starks, Jr.
(74) *Attorney, Agent, or Firm*—John L. Rogitz

(57) ABSTRACT

A system and method for training an SVM in a scalable manner includes boosting the SVM during training. Specifically, individual SVMs in an ensemble of SVMs are trained using small subsets of a training data set, with data that earlier classifiers in the ensemble incorrectly classified being overrepresented in succeeding subsets. In this way, the speed with which the overall SVM is trained is increased and the memory requirements therefor are reduced, even for relatively large training data sets.

17 Claims, 3 Drawing Sheets

OVERALL LOGIC

SELECTING
SAMPLES

*FINDING $\alpha_j$*

SYSTEM AND METHOD FOR BOOSTING SUPPORT VECTOR MACHINES

BACKGROUND OF THE INVENTION

1. Field of the Invention

The present invention relates generally to support vector machines (SVMs), and more particularly to methods and systems for boosting SVMs.

2. Description of the Related Art

Machine learning algorithms are used in many applications, such as, for instance, handwriting recognition and optical character recognition, other pattern recognition such as face recognition, eye detection, and credit card fraud detection. Machine learning algorithms are also used in, e.g., high-dimensional search in multimedia databases that contain text documents, audio, and video.

One type of machine learning algorithm is the so-called Support Vector Machine (SVM) introduced by V. N. Vapnik in *Statistical Learning Theory*, John Wiley & Sons, New York, 1998, incorporated herein by reference. Like other types of classifiers such as neural networks and decision trees, SVMs require training. Specifically, using a set of training data, classification parameters for a classifier are developed and then applied to other data for classifying the data in accordance with the classification parameters learned from the training data.

SVMs are trained using quadratic programming. Unfortunately, this training becomes impractical when the amount of training data becomes large, because a relatively large amount of memory is required and because the training process becomes excessively slow. In other words, methods for training SVMs do not scale well for large training data sets. It is nonetheless desirable to use a large amount of training data, however, for optimal training, i.e., for the highest classification accuracy.

One way to improve the performance of classifiers such as neural networks and decision trees is to use "boosting", a term for a statistical resampling technique for generating a series of training data sets for training an ensemble of classifiers. In boosting, the distribution of a training set in a series of training sets is overrepresented by training patterns that earlier classifiers in the ensemble incorrectly classified. Accordingly, in boosting the individual classifiers are trained hierarchically to learn progressively more difficult parts of a classification problem.

Heretofore, boosting has not been used with SVMs, particularly linear SVMs, because linear SVMs are so-called "stable" classifiers and it has been believed that boosting improves the performance only of unstable classifiers such as decision trees and neural networks, and not the performance of stable classifiers. Thus, the only previous motivation for using boosting—improving classifier performance—was inapplicable to SVMs. We have recognized, however, that boosting can be used for another reason in the context of SVMs which has not yet been recognized in the prior art. Specifically, we have recognized that while improving the performance of SVMs might not provide motivation for boosting, boosting can nevertheless be used to solve the above-noted scaling problem of SVMs, i.e., boosting can be used to speed up training time while reducing memory requirements.

SUMMARY OF THE INVENTION

The invention is a general purpose computer programmed according to the inventive steps herein. The invention can also be embodied as an article of manufacture—a machine component that is used by a digital processing apparatus and which tangibly embodies a program of instructions that are executable by the digital processing apparatus to undertake the logic disclosed herein. This invention is realized in a critical machine component that causes a digital processing apparatus to undertake the inventive logic herein.

In accordance with the present invention, a computer-implemented method is disclosed for training a support vector machine (SVM) useful in machine learning that includes boosting the SVM. Preferably, the act of boosting includes providing successive subsets of data from a training data set, with data being provided in at least one subset based on data in at least one preceding subset.

More specifically, the boosting act includes providing a subset of data from a training data set. Using the subset of data, at least one parameter (and preferably both parameters W and B) of an optimal hyperplane is obtained. Then, a classifier weight is derived based at least in part on the current values of the hyperplane parameters and on a classification error. The hyperplane parameters are updated based at least in part on the classifier weight, and the above steps are iteratively repeated. The subset of data used in an iteration is based at least in part on data in a prior subset, and more particularly on whether data in a prior subset was correctly classified as indicated by a probability distribution. Data is inserted into a subset in accordance with at least the probability distribution.

In another aspect, a computer is programmed to undertake logic for providing a support vector machine (SVM). The logic includes inputting successive subsets of training data into successive SVMs to obtain a final SVM having iteratively derived parameters of an optimal hyperplane.

In still another aspect, a computer program product includes computer readable code means for receiving at least one support vector machine (SVM). Computer readable code means boost the SVM using iterations of training data subsets.

The details of the present invention, both as to its structure and operation, can best be understood in reference to the accompanying drawings, in which like reference numerals refer to like parts, and in which:

BRIEF DESCRIPTION OF THE DRAWINGS

FIG. 1 is a schematic diagram of the present classification system;

DETAILED DESCRIPTION OF THE PREFERRED EMBODIMENTS

Figure 2:
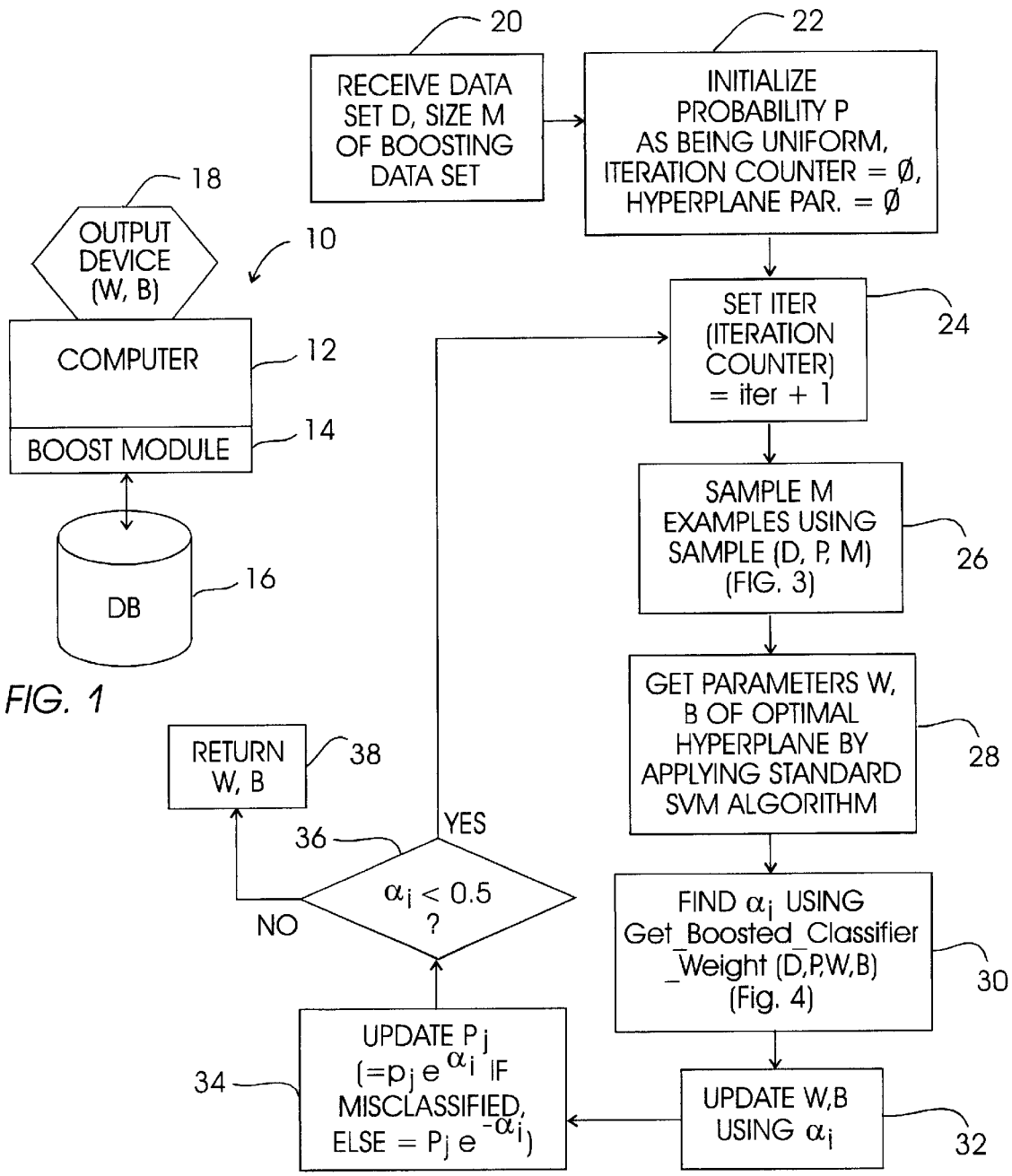
FIG. 2 is a flow chart showing the overall logic of the present invention.

Referring initially to FIG. 1, a system for machine learning classifier training is shown, generally designated 10. In the particular architecture shown, the system 10 includes a digital processing apparatus, such as a computer 12, which has a local or remote boost module 14 that embodies the logic disclosed herein. The computer 12 can access a database 16 of training pattern data and pattern data to be classified subsequent to training a machine learning classifier. The present invention is directed to training a stable machine learning classifier, and more particularly a linear SVM. The output of the module 14 can be sent to an output device 18. As shown in FIG. 1, the output might be parameters W, B of an SVM.

In one intended embodiment, the computer 12 may be a personal computer made by International Business Machines Corporation (IBM) of Armonk, N.Y. as shown, or the computer 12 may be any computer, including computers sold under trademarks such as AS400, with accompanying IBM Network Stations. Or, the computer 12 may be a Unix computer, or IBM workstation, or an IBM laptop computer, or a mainframe computer, or any other suitable computing device.

The module 14 may be executed by a processor within the computer 12 as a series of computer-executable instructions. These instructions may reside, for example, in RAM of the computer 12.

Alternatively, the instructions may be contained on a data storage device with a computer readable medium, such as a computer diskette having a data storage medium holding computer program code elements. Or, the instructions may be stored on a DASD array, magnetic tape, conventional hard disk drive, electronic read-only memory, optical storage device, or other appropriate data storage device. In an illustrative embodiment of the invention, the computer-executable instructions may be lines of compiled $C^{++}$ compatible code. As yet another equivalent alternative, the logic can be embedded in an application specific integrated circuit (ASIC) chip or other electronic circuitry. It is to be understood that the system 10 can include peripheral computer equipment known in the art, including output devices 18 such as a video monitor or printer and input devices such as a computer keyboard and mouse. Other output devices can be used, such as other computers, and so on. Likewise, other input devices can be used, e.g., trackballs, keypads, touch screens, and voice recognition devices.

Now referring to FIG. 2, the process flow of the present invention can be seen. Commencing at block 20, the training data set D is received, as is an integer M representing the desired size of each boosting data subset. In accordance with SVM training principles, the data set D consists of "N" d-dimensional vectors $x_i$ and their respective classification labels $y_i$, wherein each $y_i$ is equal to either +1 or −1, depending on whether the associated vector is a positive or negative example.

Moving to block 22, a probability vector P is initialized to a uniform distribution. The use of the probability vector P is as a sampling distribution for drawing the boosting sample, as set forth further below. Specifically, a probability P[j] exists for each of the vectors $x_j$ in D, j=1, . . . , N, with the probability P[j] being equal to the probability of $x_j$ being drawn if the data set D is sampled, and at block 22 each P[j] is initialized to be 1/N. Also, an iteration counter "iter" is initialized to zero, and the parameters W, B of the SVM hyperplane being sought are initialized to zero. As is known in the SVM art, the optimal SVM hyperplane H=Wx+B, it being the purpose of SVM training to output the "best" values for the parameters W and B.

Proceeding to block 24, the iteration counter is incremented by unity, and then at block 26 M sample vectors are drawn from the training set D using the logic of FIG. 3 as set forth below. Then, the logic moves to block 28 to obtain current iteration hyperplane parameters $W_i$, $B_i$ using any SVM algorithm known in the art. An example of an SVM algorithm that can be used at block 28 is the Sequential Minimal Optimization (SMO) algorithm disclosed by Platt in "Fast Training of Support Vector Machines Using Sequential Mining Optimization", *Advances in Kernel Methods—Support Vector Learning*, pages 185–208, MIT Press, Cambridge, Mass. 1999, incorporated herein by reference.

Figure 4:
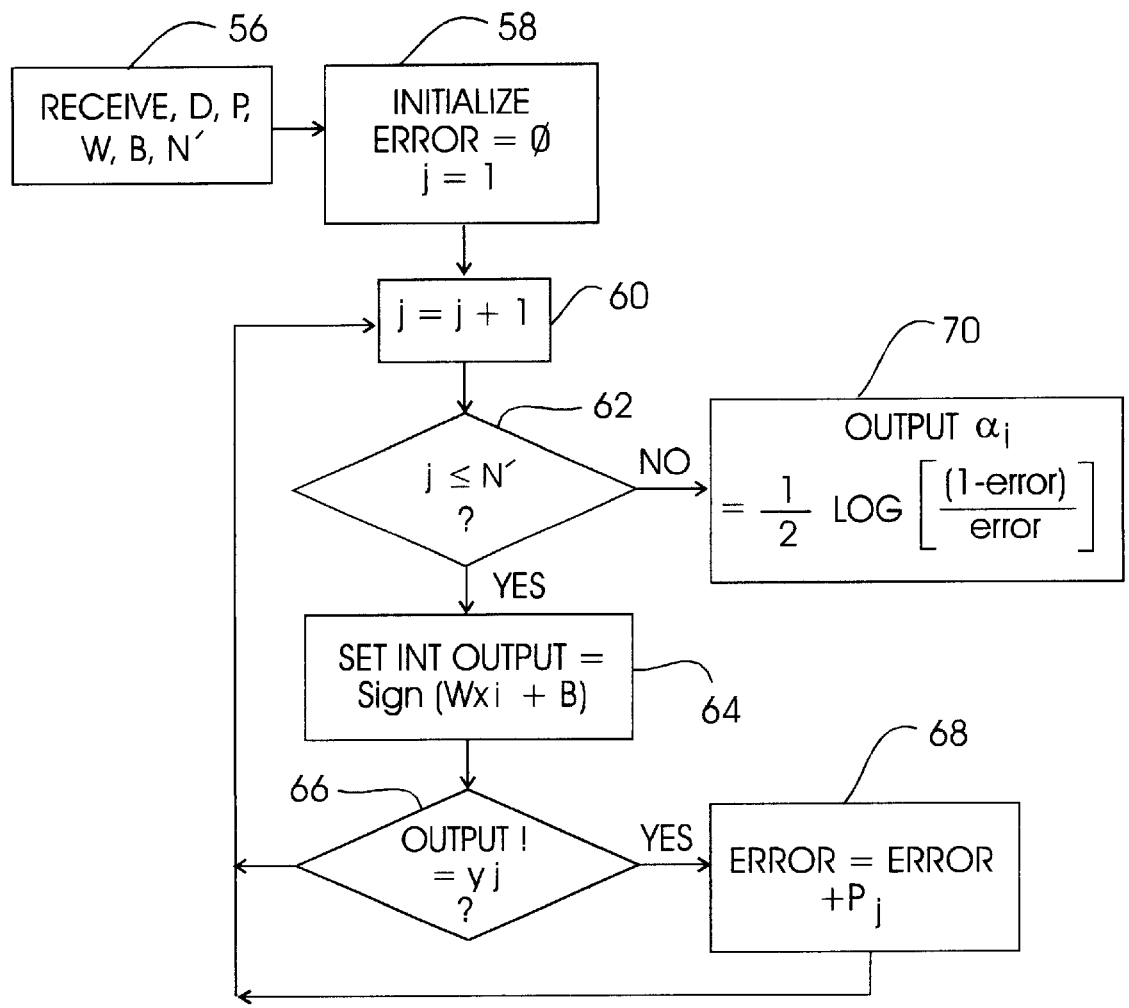
FIG. 4 is a flow chart showing the logic for obtaining the weighting factor a for an iteration.

Next moving to block 30, an iteration classifier weight $\alpha_i$ is determined using the Get_Boosted_Classifier_Weight logic shown in FIG. 4. Then, at block 32 the hyperplane parameters W and B are updated using the iteration classifier weight $\alpha_i$ as follows:

$$W = W + \alpha_i W_i, \quad B = B + \alpha_i B_i$$

After updating the hyperplane parameters at block 32, the logic flows to block 34 to update the vector P of probabilities of examples by setting each $P[j]=P[j]e^{\alpha[i]}$ if the $j^{th}$ example in the subset of M examples was misclassified, and otherwise setting each $P[j]=P[j]e^{-[i]}$. The logic then tests, at decision diamond 36, whether the iteration classifier weight $\alpha_i$ is less than a predetermined value, e.g., ½, and if so the logic loops back to block 24 for the next iteration. Otherwise, the logic ends by outputting the current values of the hyperplane parameters W, B at block 38.

The skilled artisan will appreciate that the above process essentially trains a sequence of SVMs, each of which is trained on only a small subset of data that is created by the present boosting logic. The final classifier, i.e., the SVM represented by the hyperplane parameters W, B that are output at block 38, is a linear combination of the individual SVMs.

Figure 3:
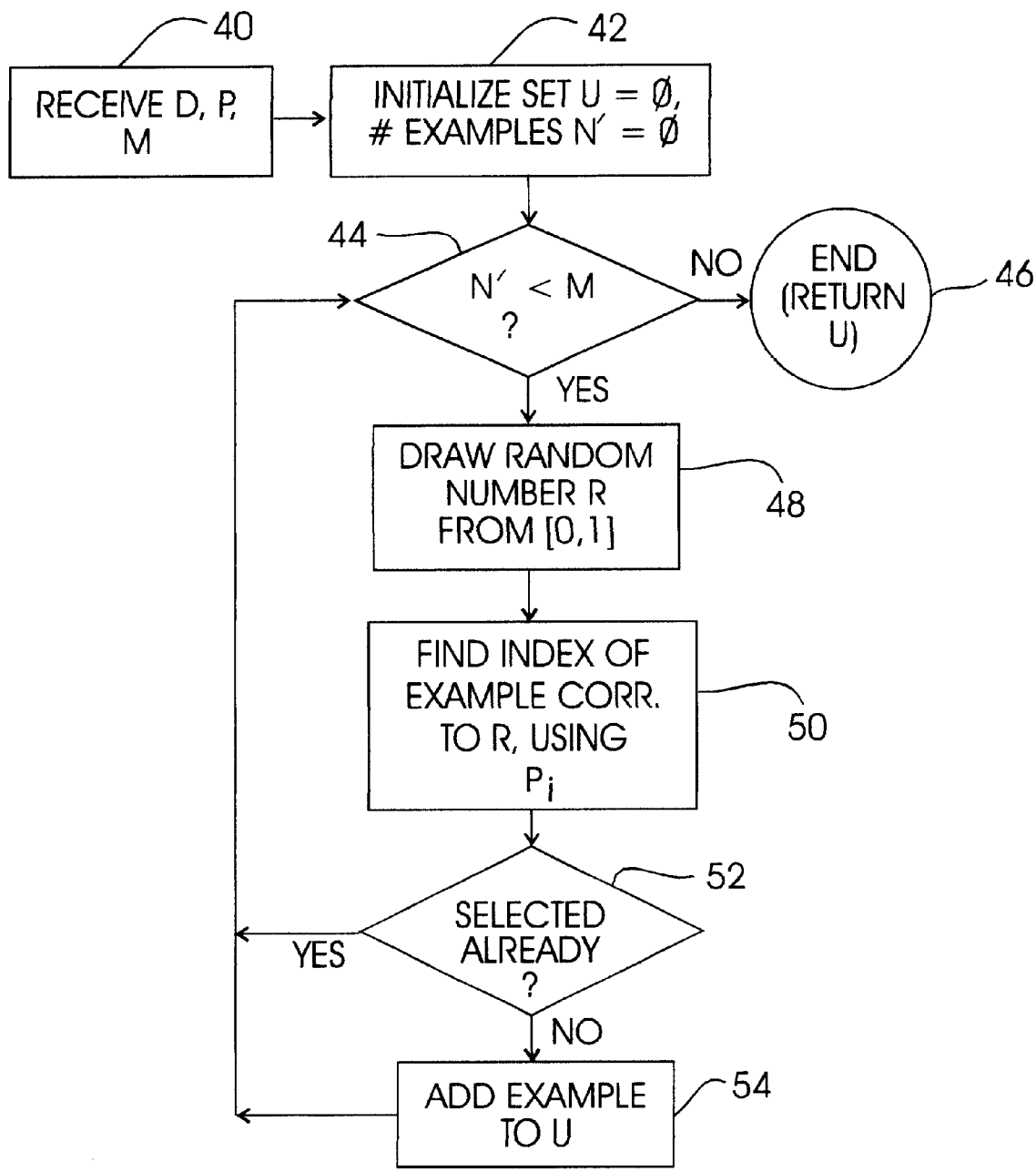
FIG. 3 is a flow chart showing the logic for selecting training sample subsets.

Now referring to FIG. 3, the logic for selecting examples for an iteration training data subset can be seen. Commencing at block 40, the data set D, vector P of probabilities of examples, and size M of the boosting data subset are received. Moving to block 42, a set U is initialized to zero and the number N' of examples selected for the set U is likewise set equal to zero. Proceeding to decision diamond 44 it is determined whether the number N' of examples selected for the set U is less than the size M of the boosting data subset, and if so the logic ends at state 46 by outputting the set U, indicating that the training data subset for the current iteration has been filled.

On the other hand, when the data set U has not yet been filled, the logic flows from decision diamond 44 to block 48, wherein a random number R is drawn from the interval [0,1]. Next moving to block 50, the index of the example$_i$ corresponding to the random number R is found using the corresponding probability P[i]. In one embodiment, this can be accomplished using the below pseudocode:

int ex_index=0;
    float sum=0;
    For (int i=0; ! ex_index && i<N'; i++) sum+=P[i];
        if (R≦sum) ex_index=i+1;
    End For Proceeding to decision diamond 52 it is determined whether the example processed at block 50 is already present in the subset U. If it is, the logic loops back to decision diamond 44. Otherwise, the example is added to the iteration training data subset U at block 54, N' is incremented by unity, and the example is marked as being a member of U. The logic then returns to decision diamond 44. Thus, misclassified data is overrepresented in later iteration subsets.

Now referring to FIG. 4, the logic for finding the iteration weight $\alpha_i$ can be seen. Commencing at block 56, the above-mentioned parameters D, P, W, B, and N' are received. Moving to block 58, an error is initialized to zero and a counter j is initialized to one.

Proceeding to block 60, the counter j is incremented by unity. From block 60, the logic flows to decision diamond 62, wherein it is determined whether the counter j is less than or equal to the number N' of examples in the iteration subset U, discussed above in relation to FIG. 3. If the test at decision diamond 62 is positive, the logic moves to block 64 to identify whether the example under test is correctly classified using the current hyperplane parameters W and B as follows. A variable int output is set equal to sign($Wx_t+B$) at block 64, and then at decision diamond 66 it is determined whether the example has been misclassified by determining whether output!=$y_j$. If so, the logic moves to block 68 to modify the error by adding to it the probability P[j] associated with the $j^{th}$ example. From block 68, or from decision diamond 66 if the example had been correctly classified, the logic loops back to block 60.

When it is determined at decision diamond 62 that all examples in the iteration subset have been tested, the logic ends at block 70 by outputting the iteration weight $\alpha_i$. To do this, the logic outputs one-half of the logarithm of the quotient of one minus the error, divided by the error.

While the particular SYSTEM AND METHOD FOR BOOSTING SUPPORT VECTOR MACHINES as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for" or, in the case of a method claim, the element is recited as a "step" instead of an "act".

We claim:

1. A computer-implemented method for training a support vector machine (SVM) useful in machine learning, comprising the acts of:
    boosting the SVM.

2. The method of claim 1, wherein the act of boosting further includes:
    providing successive subsets of data from a training data set, data being provided in at least one subset based on data in at least one preceding subset.

3. The method of claim 1, wherein the boosting act includes:
    providing a subset of data from a training data set;
    using the subset of data to obtain at least one parameter of an optimal hyperplane;
    deriving a classifier weight based at least in part on the parameter;
    updating the parameter based at least in part on the classifier weight; and
    iteratively repeating the providing, using, deriving, and updating acts.

4. The method of claim 3, wherein the act of deriving a classifier weight is based at least in part on a classification error.

5. The method of claim 4, wherein the subset of data is based at least in part on data in a prior subset.

6. The method of claim 4, wherein data is inserted into a subset in accordance with at least one probability distribution.

7. A computer programmed to undertake logic for providing a support vector machine (SVM), the logic comprising:
    inputting successive subsets of training data into successive SVMs to obtain a final SVM having iteratively derived parameters of an optimal hyperplane.

8. The computer of claim 7, wherein the subsets of training data are derived based on previous subsets.

9. The computer of claim 8, wherein the inputting act undertaken by the logic includes:
    providing a subset of data from a training data set;
    using the subset of data to obtain at least one parameter of an optimal hyperplane;
    deriving a classifier weight based at least in part on the parameter;
    updating the parameter based at least in part on the classifier weight; and
    iteratively repeating the providing, using, deriving, and updating acts.

10. The computer of claim 9, wherein the logic derives a classifier weight is based at least in part on a classification error.

11. The computer of claim 10, wherein the logic inserts data into a subset in accordance with at least one probability distribution.

12. A computer program product including:
    computer readable code means for receiving at least one support vector machine (SVM); and
    computer readable code means for boosting the SVM using iterations of training data subsets.

13. The computer program product of claim 12, wherein the means for boosting includes:
    computer readable code means for providing successive subsets of data from a training data set, data being provided in at least one subset based on data in at least one preceding subset.

14. The computer program product of claim 12, wherein the means for boosting includes:
    computer readable code means for providing a subset of data from a training data set;
    computer readable code means for using the subset of data to obtain at least one parameter of an optimal hyperplane;
    computer readable code means for deriving a classifier weight based at least in part on the parameter;
    computer readable code means for updating the parameter based at least in part on the classifier weight; and
    computer readable code means for iteratively repeating the providing, using, deriving, and updating acts.

15. The computer program product of claim 14, wherein the means for deriving a classifier weight uses at least in part a classification error.

16. The computer program product of clam 14, wherein the subset of data is based at least in part on data in a prior subset.

17. The computer program product of claim 14, wherein the means for providing a subset of data inserts data into a subset in accordance with at least one probability distribution.

* * * * *